United States Patent [19]
Eskeli

[11] 3,854,841
[45] Dec. 17, 1974

[54] TURBINE

[76] Inventor: Michael Eskeli, 7994-41 Locke Lee, Dallas, Tex. 77042

[22] Filed: Oct. 9, 1973

[21] Appl. No.: 404,406

[52] U.S. Cl. ................................. 415/81, 415/178
[51] Int. Cl. ....... F01d 1/16, F01d 5/08, F01d 25/08
[58] Field of Search .......... 415/80, 81, 178, 179, 63, 415/82; 60/39.35

[56] References Cited
UNITED STATES PATENTS

| | | | |
|---|---|---|---|
| 2,060,414 | 11/1936 | Fladeland | 415/80 |
| 2,596,276 | 5/1952 | Napoli | 415/80 |
| 2,768,808 | 10/1956 | Worre | 415/80 |
| 2,596,276 | 10/1961 | Ross | 60/39.35 |
| 3,611,814 | 10/1971 | Haack | 74/5 |
| 3,727,401 | 4/1973 | Fincher | 415/80 |

Primary Examiner—C. J. Husar
Assistant Examiner—L. J. Casaregola

[57] ABSTRACT

A method and apparatus for generating power by passing a fluid from a higher energy level to a lower energy level through a rotating turbine wheel. The fluid is first compressed within said turbine rotor, with accompanying pressure increase, and the said fluid is accelerated within said rotor, thus obtaining a fluid that has a high absolute velocity and elevated pressure, this fluid is then passed to a second portion of the rotor where the kinetic energy contained by said fluid is converted to work. This work is then passed to the rotor shaft as the work output of the turbine. In an alternate arrangement, heat may be added to the fluid during its passage through the rotor increasing the work output of the turbine.

6 Claims, 4 Drawing Figures

PATENTED DEC 17 1974 3,854,841

TURBINE

BACKGROUND OF THE INVENTION

This invention relates generally to devices for generating power in response of a fluid being flowed from a higher energy level to a lower energy level by passing said fluid through a rotating turbine rotor.

There have been various types of turbines previously; in some of these a fluid is accelerated in a sigle or multiple stationary nozzles and then passed to vanes mounted on a rotating rotor wheel, where the kinetic energy of the moving fluid is converted to power.

These conventional turbines normally have high energy losses due to fluid friction, especially between the rotor vanes and the fluid where the velocity differentials are usually large. Also, these turbines often require complex shaped turbine vanes making the unit costly.

DESCRIPTION OF PREFERRED EMBODIMENTS

It is an object of this invention to provide a turbine for generating power which is simple in construction and low in cost, and which has a high efficiency of operation with low fluid velocities relative to the turbine rotor. Further, it is an object of this invention to provide a turbine where the turbine rotor may be encased within a vacuum casing to reduce friction losses on rotor external surfaces. Also, it is an object of this invention to provide a turbine wherein the fluid passing through the said turbine rotor may have heat added to it from another heating fluid being circulated in heat exchange relationship with said fluid either during expansion, during compression, or during both compression and expansion, for increased power output from said turbine.

Figure 1:
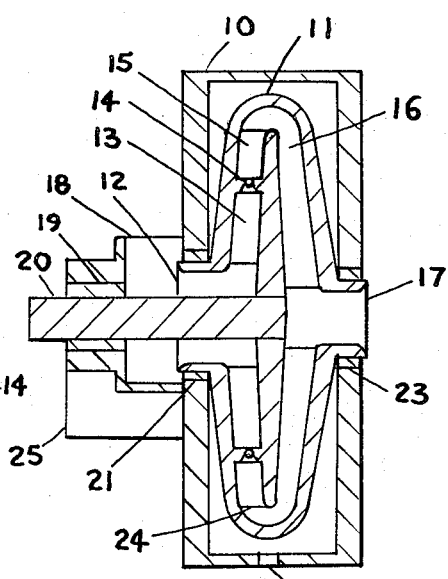
FIG. 1 is a cross section of one form of the turbine.

Referring to FIG. 1, therein is illustrated a form of the turbine in cross section; and without said heat exchanger. 10 is casing, 11 is rotor. Fluid enters via entry opening 18 and passes to rotor 11 via opening 12, and from there to rotor compression cavity where vanes 13 will assure that the fluid will rotate with said rotor; after compression and pressurization, said fluid is passed through nozzles 14 oriented to discharge said fluid forward so that the absolute tangential velocity of said fluid will be the sum of the tangential velocity of said nozzles 14 and the discharge tangential velocity of the fluid. Said fluid enters a space 15 within said rotor, and then passes to the expansion side of the rotor where the motive energy of the fluid is converted to work, with vanes 16 assuring that said fluid will rotate with said rotor. The fluid then leaves via exit opening 17. 20 is rotor shaft fixed to rotor 11, 19 is rotor shaft bearing, 25 is bearing support, 21 and 23 are rotor seals, 22 is vent communicating with space within casing and around rotor, and 24 indicates the point where fluid enters rotor area with vanes to control fluid flow with these vanes extending to the rotor exit near 17.

Figure 2:
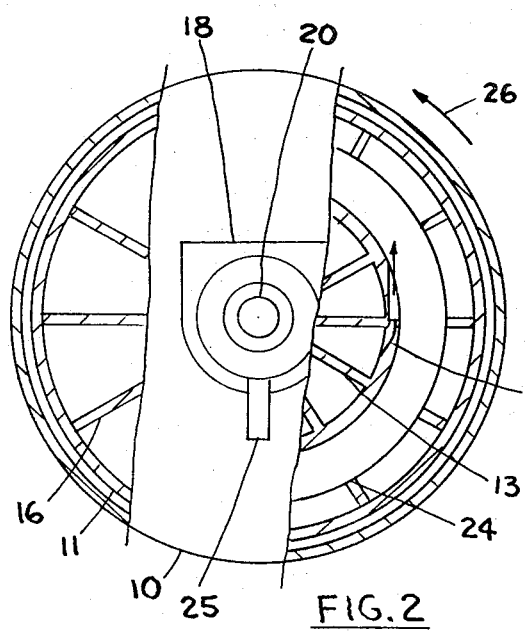
FIG. 2 is an end view of the same unit.

In FIG. 2, an end view of the turbine is illustrated, with some sections removed to show internal details. 10 is casing, 11 is rotor, 16 are vanes for converting motive energy to work, 18 is fluid inlet, 20 is rotor shaft, 26 indicates direction of rotor rotation, 14 is fluid nozzle mounted on a divider within rotor cavity, adapted for passing through said fluid, 13 are vanes within rotor cavity, 24 are points where fluid enters expansion side vanes, 25 is bearing support.

Figure 3:
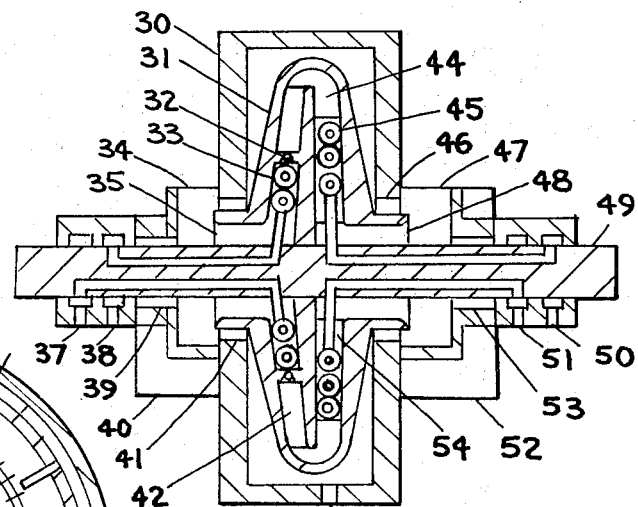
FIG. 3 is a cross section of another form of the turbine.

In FIG. 3, a form of the turbine is shown where heat exchangers are placed within rotor cavity to add heat to the fluid; the turbine is shown in cross section. 34 is fluid entry, 35 is fluid entry to rotor, 33 is heat exchanger in rotor cavity, compression side; 32 are nozzles, 42 is space into which fluid enters on leaving said nozzles, 44 are rotor vanes, 45 is another heat exchanger within the expansion section of the rotor cavity, 48 is rotor fluid exit, 47 is fluid exit, 30 is casing, 31 is rotor, 41 and 46 are rotor seals, 49 is rotor shaft, 50 and 51 are heating fluid inlet and outlet to heat exchanger 45, 52 is bearing support, 53 and 39 are shaft bearings, 37 and 38 are heating fluid inlet and outlet to heat exchanger 33, 40 is bearing support, 43 is casing vent into which a vacuum pump may be connected to evacuate the space between rotor and casing.

Figure 4:
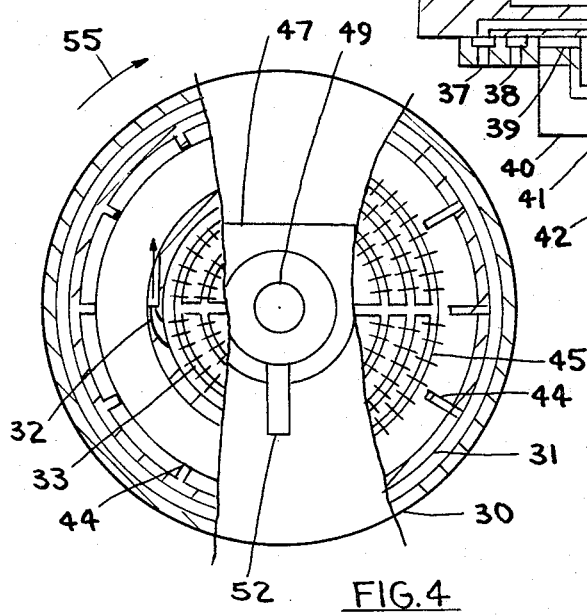
FIG. 4 is an end view of the unit of FIG. 3.

In FIG. 4, an end view of the unit shown in FIG. 3 is illustrated. 47 is fluid exit, 49 is rotor shaft, 45 is heat exchanger, 44 is rotor vane, 31 is rotor, 30 is casing, 52 is bearing support, 44 is rotor vane, 33 is heat exchanger, 32 is fluid nozzle mounted on divider wall, 55 indicates direction of rotation for rotor.

In operation, fluid at higher energy level enters rotating rotor 11 via entry 12 and is pressurized within said rotor by centrifugal force acting on the fluid, with vanes 13 assuring that the fluid will rotate with said rotor. After compression, the fluid is passed through nozzles 14 in forward direction so that the tangential velocity of the fluid leaving said nozzles is added to the tangential velocity of the said rotor. Thus said fluid will have an absolute tangential velocity on discharge side of said nozzles that is greater than the tangential velocity of said rotor in the same area. The fluid will then enter to the expansion side of the rotor where the motive energy contained by said fluid is converted to work. The tangential fluid velocity and the tangential rotor velocity are usually the same at point 24 where the exit side vanes start, so as to provide for smooth passage of the fluid to spaces between said vanes 16; the velocity of the said fluid may be different at point 24 than the rotor velocity, and the vanes may be suitably shaped to provide for smooth passage for the fluid between said vanes. After passing between said vanes, said fluid is decelerated as it passes toward the rotor center and work is thus obtained from said fluid; this work is then passed to the rotor shaft 20. Work is required to accelerate said fluid when passing through vane spaces on inlet side, and through nozzles 14; the net work output for this turbine is the work put out by vanes 16 less the acceleration work in vanes 13 and in nozzles 14. After said fluid has been decelerated in vanes 16, said fluid is discharged via exit 17 at a lower energy level than at entry 12.

The operation of the unit shown in FIG. 3, is similar to that described hereinbefore for the unit of FIG. 1, except that heat may be added to the working fluid in the heat exchangers. Either one of the heat exchangers 33 and 45 may be used, or both may be used simultaneously. Normally, the radial velocity of the fluid through the turbine rotor is low, and heat addition to the working fluid may be readily provided. Heat addition during compression by heat exchanger 33 increases the enthalpy of the working fluid, with some reduction in density as compared to a unit without a heat exchanger. This increase in enthalpy and a reduction in density will allow a greater tangential tip velocity for vanes 44, thus resulting in increased work output. The addition of heat during expansion in heat exchanger 45, will reduce the density of the fluid being expanded and this in turn will reduce the pressure on the exit side of the rotor where vane 44 is located, thus allowing a greater tip velocity for vanes 44 and resulting in greater work output. The tip velocity for vanes 44 being the tangential velocity of said vanes near the periphery of said rotor.

It should be noted that normally the working fluid velocity leaving the nozzles 32 and nozzles 14 is relatively low, and is normally below sonic velocity even when gaseous fluids are used as said working fluid. Said nozzles 32 and 14 are sized and shaped for the fluid, to provide for highest attainable exit velocity for the fluid for the available pressure and enthalpy differential between the entry and exit ends of said nozzles.

The working fluid is normally either a gas or a liquid. Fluids containing both gaseous and liquid components can not usually be passed through this turbine; minor amounts of liquids may be discharged from the rotor via small vents that may be provided near the rotor periphery. Such vents are not shown on the drawings.

The heating fluid may either a gas or a liquid. The heat exchanger passages for the heating fluid are indicated in the drawings to be relatively small, and more suited for liquids. Gaseous heating fluids may be used if said heating fluid passages are suitably enlarged. Also, additional heating can be obtained with gaseous heating fluids by proper selection of said fluids so that advantage may be taken from the heat of compression of such heating fluid within said heat exchangers when such heating fluid is compressed within the heat exchanger coils with accompanying temperature increase.

The rotor in the drawings is shown shaped to allow for high rotational speeds, with heavy material sections especially near the rotor center. The heat exchangers are shown having been made of finned tubing; other types of heat exchanger arrangements may be used. Thermal insulation may be provided to prevent undesirable heat transfer within rotor; such insulation has not been shown as it is within existing art.

The turbine of this invention may be also made as a multi-stage unit, with the working fluid passing from one stage to next, with a reduction in energy level in each stage for the fluid. In these arrangements, two or more of the said rotor wheels are mounted on a single shaft, with the exit of a previous stage connected to the entry of the succeeding stage.

Various controls, gauges and governors are used with the turbine of this invention. These do not form a part of this invention and are not further described herein.

What is claimed is:

1. A turbine for generating power comprising:
   a. a casing for supporting a shaft;
   b. a shaft journalled in bearings for rotation and supported by said casing;
   c. a rotating rotor mounted on said shaft so as to rotate in unison therewith; said rotor having an entry port disposed near the center of said rotor for entry of a working fluid with said entry port communicating with radially outward extending passageways for passing said working fluid; said outward extending passageways having vanes therewithin for ensuring that said working fluid will rotate with said rotor for acceleration and for pressurizing said working fluid; said radially extending passageways being provided with nozzles at their outward ends for passing said working fluid with said nozzles being oriented to discharge said working fluid forward in the direction of rotation thus increasing the absolute tangential velocity of said working fluid to a value greater than the tangential velocity of said nozzles; said nozzles discharging said working fluid to a first peripheral cavity of said rotor; said working fluid being then passed from said first peripheral cavity to rotor inward extending passageways with said inward extending passageways being provided with vanes for assuring that said working fluid will rotate with said rotor and for generation of power associated with the deceleration of said working fluid; the outward ends of said vanes within said inward extending working fluid passageways being at radial distance greater from rotor center than the discharge ends of said nozzles; said inward extending passageways being connected with an exit port being disposed near the center of said rotor for discharge of said working fluid;
   d. a fluid being flowed through said rotor; said fluid being flowed into said inlet of said rotor and being pressurized by centrifugal compression therewithin and discharged outwardly and substantially tangentially in said forward direction at a tangential velocity that is substantially higher than said tangential velocity of said nozzles; said fluid having high said tangential velocity because of the additive effects of the pressure velocity of the fluid under the differential pressure existing between the entry and exit ends of said nozzles plus the tangential velocity due to the tangential velocity of said nozzles.

2. The turbine of claim 1 wherein said working fluid is at a higher energy level at the said entry to said rotor than at said exit from said rotor.

3. The turbine of claim 1 wherein a heating heat exchanger is placed within said radially outward extending working fluid passageways for adding heat to said working fluid during and after compression and acceleration of said working fluid, with a heating fluid being circulated through said heat exchanger with said heating fluid being supplied and then returned via passages near the center of rotation of said rotor.

4. The turbine of claim 1 wherein a heating heat exchanger is placed within said radially inward extending working fluid passageways for adding heat to said working fluid during expansion and deceleration of said working fluid for the purpose of reducing the density of said working fluid; said heating fluid being circulated within a heat addition heat exchanger and supplied and returned via passages near the center of rotation of said rotor.

5. The turbine of claim 1 wherein said working fluid is a liquid.

6. The turbine of claim 1 wherein said working fluid is a gas.

* * * * *